(No Model.)
F. H. HARRIS.
WHEEL.
No. 369,850. Patented Sept. 13, 1887.
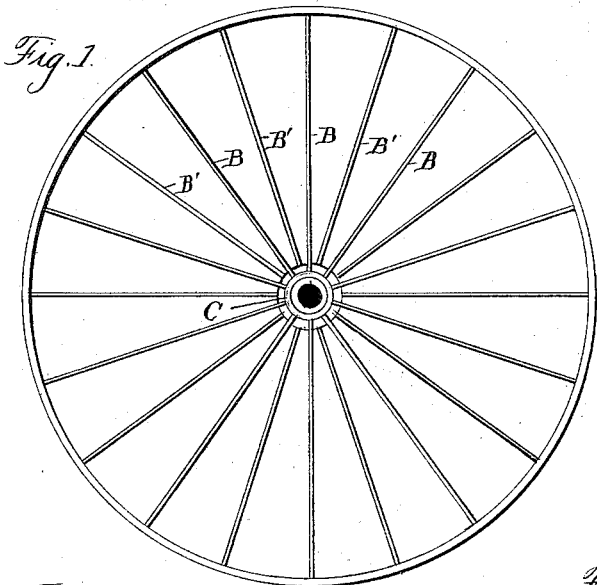
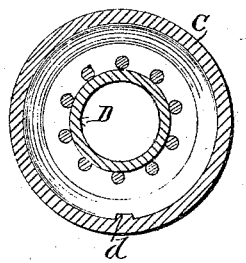
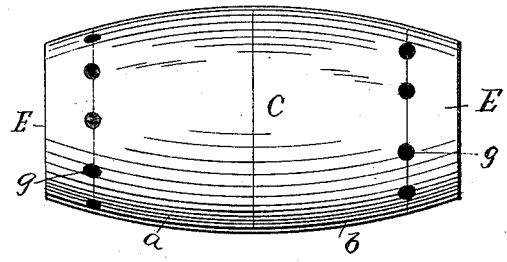
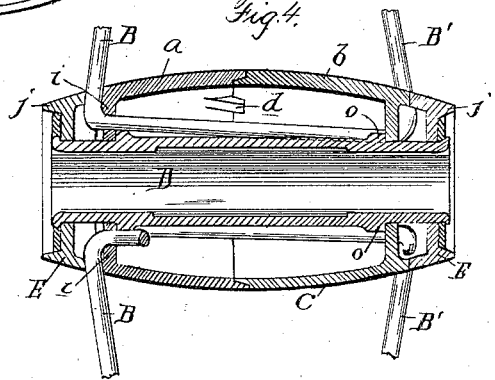
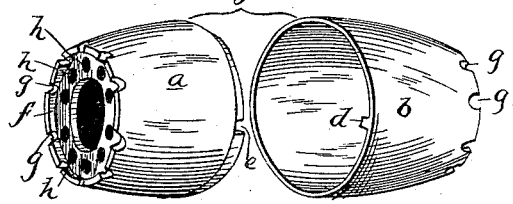
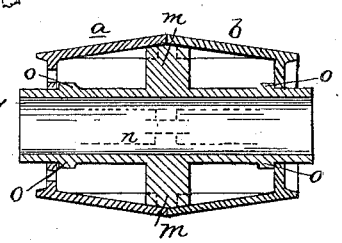
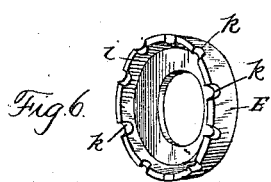
WITNESSES:
INVENTOR:
Frank H. Harris
BY T. W. Robertson
ATTORNEY.

UNITED STATES PATENT OFFICE.

FRANK H. HARRIS, OF TOLEDO, OHIO.

WHEEL.

SPECIFICATION forming part of Letters Patent No. 369,850, dated September 13, 1887.

Application filed June 2, 1887. Serial No. 240,039. (No model.)

*To all whom it may concern:*

Be it known that I, FRANK H. HARRIS, of Toledo, in the county of Lucas and State of Ohio, have invented new and useful Improvements in Wheels; and I do hereby declare that the following is a full, clear, and exact description thereof, reference being had to the accompanying drawings, which form a part of this specification.

This invention relates to new and useful improvements on wheels; and the invention has particular reference to that class of wheels formed entirely of metal, the spokes being formed of wire and radiating in oblique directions from the two ends of the hub to the tire, such wheels being usually employed in the manufacture of bicycles, tricycles, baby-carriages, and other light vehicles.

The invention consists in the peculiar construction of the hub and the means provided for securing the spokes, so as to secure durability, strength, lightness, and facilities for repairs.

Figure 1 is an elevation of a finished wheel. Fig. 2 is a longitudinal elevation of the hub. Fig. 3 is a cross-section of the hub. Fig. 4 is a central longitudinal section of the hub. Fig. 5 is a perspective view of the two parts of the shell. Fig. 6 is a perspective view of one of the caps. Fig. 7 is a central longitudinal section of the hub of modified construction.

In the accompanying drawings, which form a part of this specification, A is the metal rim or tire.

B B' are the wire spokes. The spokes B radiate from one end of the hub and alternate with the spokes B', which radiate from the other end.

C is a hollow metal hub, constructed as follows: *a b* each represents one half of the hollow metal hub, which is of tapering form, so as to constitute a hub tapering from the middle toward the ends, which latter are closed and provided with a central aperture, through which the axle-box D projects, and is supported therein. Each part of the hub is provided upon its outer end with a flange, *f*, which projects beyond the end wall and has notches *g*, which radially correspond with the holes *h* in the end wall of the shell of each part *a b*. The notches *g* and corresponding holes, *h*, in one end of the hub are not placed directly opposite those in the other end, but intermediate between, so that the spokes which radiate from one end of the hub alternate with the spokes radiating from the other end, said spokes being constructed in pairs, as described in a former patent granted to me November 23, 1886, and numbered 353,060—that is, single pieces of wire of sufficient length are inserted longitudinally through the holes in the ends of the hub, and are then bent to form a pair of spokes oppositely inclined to each other and forming two contiguous spokes in the wheel, their ends being riveted fast to the rim of the wheel. Thus each pair of spokes is connected through the hub of the wheel by means of a horizontal portion, which passes slightly obliquely through the hub and bears against the axle-box.

To hold the two parts of the hub in their proper relative positions to bring the spoke-notches and spoke-openings on one end intermediate to those on the opposite end, the meeting face of one part is provided with one or more lugs, *d*, and the meeting face of the other with corresponding recesses, *e*, to register therewith, and to firmly join the two parts their meeting faces are preferably provided with overlapping flanges. Other devices to accomplish the same end may be employed, however, as shown in the modification in Fig. 7, wherein the axle-box is provided with radial lugs *m*, which enter sockets *n*, formed on the inside of the hub, partly on one half and partly on the other half thereof.

E are metal caps, centrally apertured to engage upon the projecting ends of the axle-box. They fit against the ends of the hub and conform to the general shape thereof. The inner and outer faces of these caps are recessed, so as to form circular flanges *i j*. The inner flange, *i*, of each of these caps is provided with notches *k*, which correspond with the notches *g* upon the ends of the hub, so as to confine the spokes at the points from which they radiate from the hub. The two caps are secured in place by means of the axle-box. This is done by upsetting the ends of the axle-box or otherwise securing the caps to those ends; or, to give a better finish to the outer ends of the caps, metal washers F may be employed, as shown in the drawings. These washers are centrally apertured to fit over the outer ends of the axle-box and rest within the recessed outer face of the cap. By peening or rivet-heading the projecting ends of the axle-box, or by soldering or other known desirable means, the cap and washer are then secured in place upon the ends of the hub, and the parts are thereby firmly bound together, while at the same time, for purposes of repair in case of broken spokes, the caps can readily be removed and the broken spoke taken out and replaced without disturbing the wheel.

The axle-box D has preferably shoulders $o$ formed thereon, to hold the axle-box firmly in place within the hub, and these shoulders also form additional bearings for the inner ends of the spokes. Between these shoulders the axle-box is then cut away to permit the spokes to connect in a straight line obliquely through the hub, and these connecting portions of the spokes also find a bearing on the axle-box between the shoulders. By means of the construction described the wheel is perfectly solid and strong, and at the same time rendered light and graceful in appearance. It will be seen that the caps are used more for the sake of finish than otherwise, and for a cheaper class of wheels may be omitted.

What I claim as my invention is—

1. In a wheel, the combination, with a metallic hub provided with longitudinal spoke-passages through the hub and with spoke-notches formed on the ends of the hub, of spokes formed in pairs connected by a horizontal portion passing through the hub, of an axle-box secured in the hub, having shoulders within the hub and projecting through the ends of the hub, and of two caps secured to the projecting ends of said axle-box and provided with spoke-grooves corresponding with those upon the ends of the hub, substantially as described.

2. In a wheel, the combination of a hollow metallic hub tapering from the center toward the ends and formed in halves provided with registering and lap-jointed meeting faces, of spoke-notches formed in the tapering ends of the hub, of spoke-apertures formed through the end walls of the hub, and of spokes formed in pairs connected by horizontal portion passing longitudinally through the hub, substantially as described.

3. In a wheel, the combination, with the two-part metallic hub having the spokes secured thereto in pairs, substantially as described, of the axle-box D, having the shoulders $o$, as and for the purpose specified.

4. In a wheel, the combination, with the two-part metallic hub having the spokes secured thereto in pairs, substantially as described, of the axle-box D, provided with shoulders $o$, and having the portion between such shoulders reduced, substantially as and for the purposes described.

5. In a wheel, the combination of the two-part metallic hub $a\,b$, having interlocking circular flanges C, lug $d$, and recess $e$, the circular flanges $f$, provided with spoke-notches $g$, the spoke-apertures $h$ in the end walls of the hub, and the spokes B B', formed in pairs and passing longitudinally through the hub, substantially as described.

6. In a wheel, the combination, with the two-part hollow metallic hub $a\,b$, having interlocking meeting faces, of the circular flanges C, having spoke-notches $g$ formed therein, the spoke-apertures $h$ in the end walls of the hub, the spokes B B', made in pairs and connected longitudinally through the hub, the caps E, having spoke-notches $k$, and the axle-box D, concentrically supported in apertures in the end walls of the hub and connecting the hub and caps together, substantially as described.

7. In a wheel, the combination, with a two-part hollow metallic hub having interlocking central meeting faces, of central apertures formed in the end walls of the hub, caps fitting against the ends of the hub and having corresponding central apertures with the hub, and means, as described, for tying the hub and caps together through the medium of said axle-box, substantially as specified.

FRANK H. HARRIS.

Witnesses:
H. S. SPRAGUE,
ADOLPH BARTHEL.